Patented Nov. 20, 1951

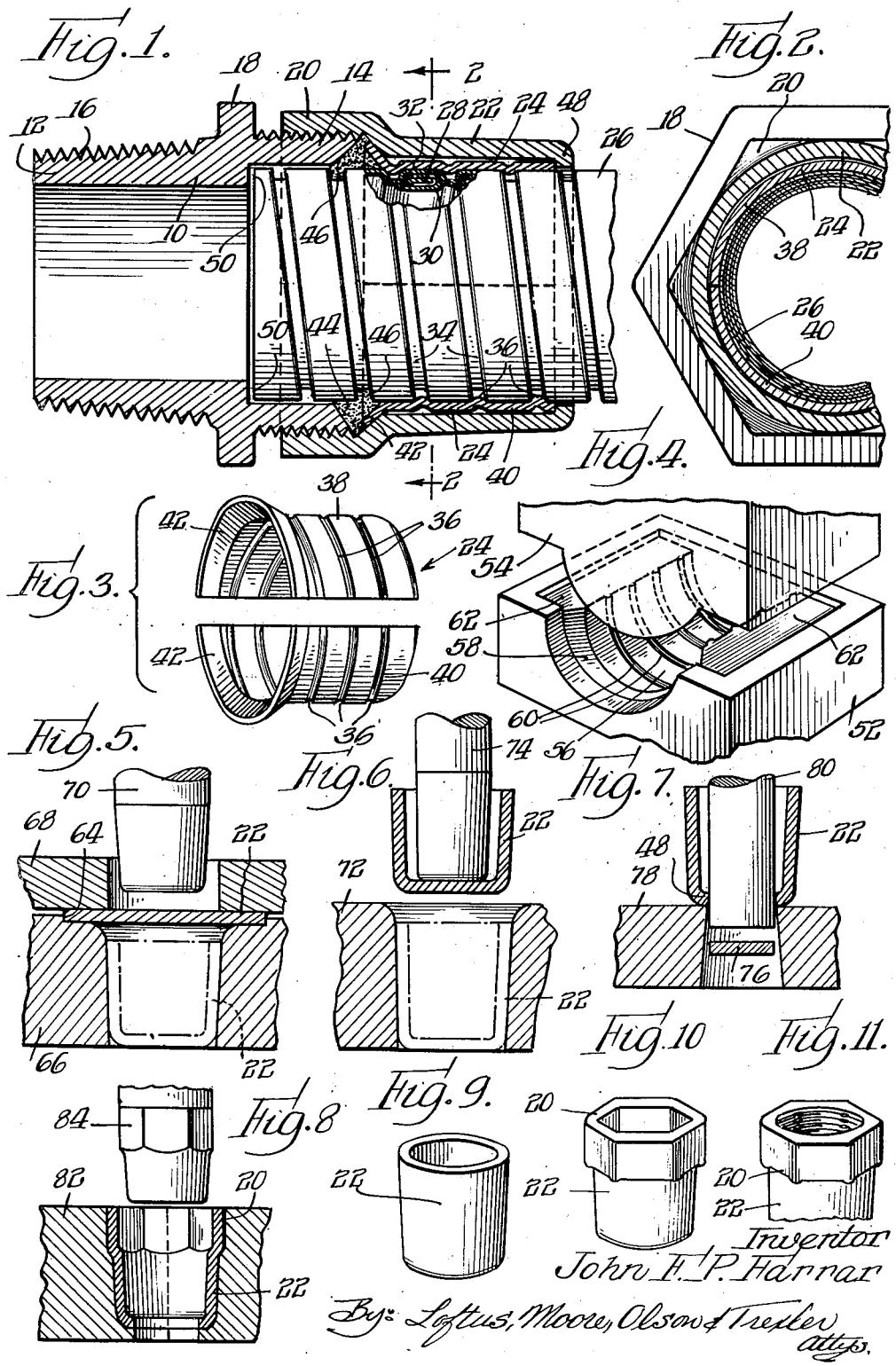

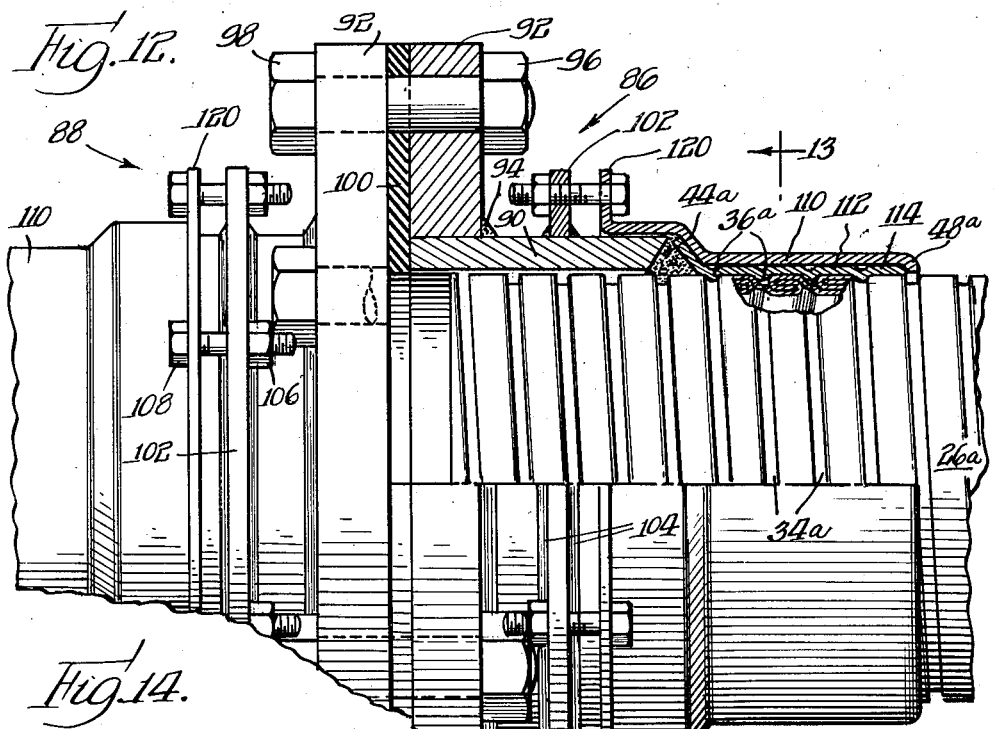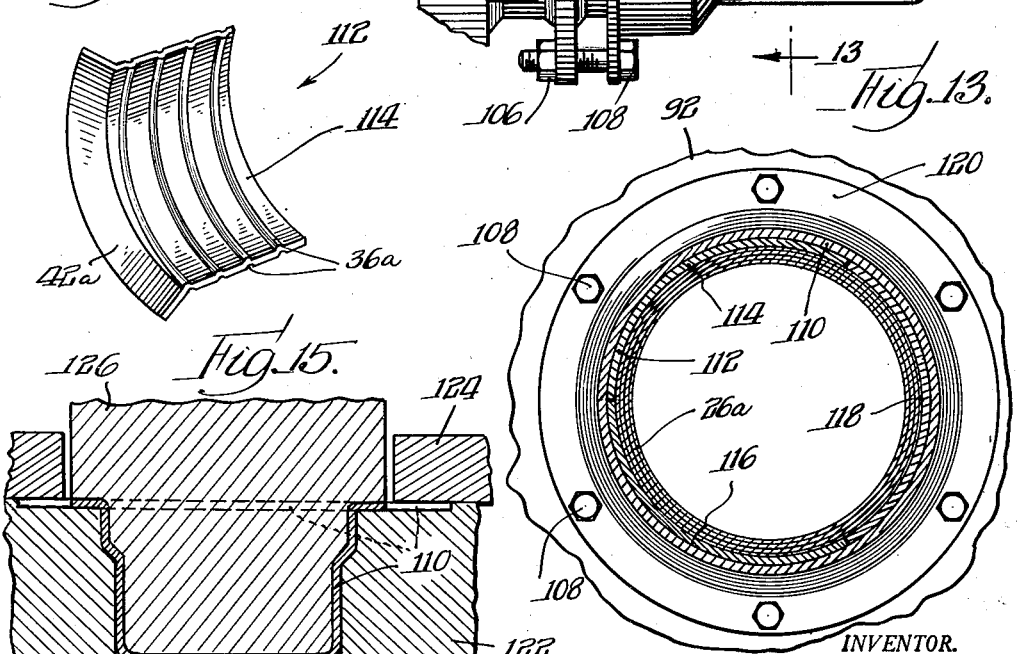

2,575,338

UNITED STATES PATENT OFFICE 2,575,338

COUPLING STRUCTURE

John F. P. Farrar, Maywood, Ill., assignor to Chicago Metal Hose Corporation, Maywood, Ill., a corporation of Illinois Application December 21, 1944, Serial No. 569,148

2 Claims. (Cl. 285—72)

This invention relates to coupling structures, particularly for flexible metal hose of the convoluted or corrugated type, and to methods for effecting the fabrication and assembly thereof.

It is an object of the invention to provide a coupling structure, for flexible metal hose, of improved and simplified construction; and to provide improved and more readily operable and simplified methods of fabrication and assembly for coupling structures of the type defined.

More specifically stated, it is an object of the invention to provide an improved and simplified coupling structure, particularly for flexible metal hose of the corrugated or convoluted type, wherein certain of the coupling parts and particularly the hose gripping and interlocking portions thereof, may be readily fabricated by a series of stamping operations, and more easily and expeditiously assembled and arranged in operative position upon the hose.

A still further object of the invention is to provide an improved coupling structure for flexible metal hose, having positive gripping engagement therewith, and wherein the coupling parts and particularly the hose interengaging portions thereof are readily adaptable to irregularities and variations in the hose size and in the terminal or end portions of the hose structures.

Various other objects, advantages and features of the invention will be apparent from the following specification when taken in connection with the accompanying drawings wherein certain preferred embodiments are set forth for purposes of illustration.

In the drawings wherein like reference numerals refer to like parts throughout:

Fig. 1 is a longitudinal sectional view of a coupling structure, in one embodiment thereof, and associated hose end portion; the coupling structure being constructed in accordance with and embodying the principles of the invention;

Fig. 2 is a partial transverse sectional view of the structure of Fig. 1, taken as indicated by the line 2—2 thereof;

Fig. 3 is an exploded detail perspective view on a somewhat reduced scale, of the hose interlocking sleeve, forming a part of the coupling structure of Figs. 1 and 2;

Fig. 4 is a partial detail perspective view of a die structure, used in fabricating one of the interlocking sleeve parts;

Figs. 5, 6, 7 and 8 are detail views illustrating successive steps in fabricating the clamping or retainer sleeve, also forming a part of the coupling structure, the parts being shown on a reduced scale;

Figs. 9, 10 and 11 are detail perspective views illustrating the retainer sleeve in various successive steps of formation;

Fig. 12 is a longitudinal view, partly in section, of a coupling structure, and associated hose portions, as constructed in accordance with a modified embodiment of the invention;

Fig. 13 is a reduced partial transverse sectional view of the coupling structure of Fig. 12, taken as indicated by the line 13—13 thereof;

Fig. 14 is a detail perspective view of one section of the hose interlocking sleeve, as embodied in the structure of Figs. 12 and 13; and Fig. 15 is a reduced illustrative view, showing the method of fabricating the clamping or retaining sleeve, in the coupling structure of Figs. 12 and 13.

In the drawings the invention has been shown applied to the fabrication and assembly of a coupling structure for flexible metal hose of the spirally wound interlocked strip type, as the invention in certain of its aspects is particularly adapted to hose structures of this character.

It is to be understood however that the invention, in various of its aspects, is also adapted for use in the manufacture and assembly of couplings and fittings for other types of hose, such for example as other types of corrugated or convoluted flexible metal hose or tubing having helical, annular, or otherwise formed grooves or corrugations.

Referring more specifically to the drawings, and first to the embodiment illustrated in Figs. 1–11, the coupling structure shown comprises a main coupling body 10, Fig. 1, having a tapered threaded end portion 12 and an oppositely extending threaded projecting portion 14. As will be understood, the coupling body may be adapted for application to or connection with any suitable cooperating coupling element or fitting, the attachment means on the end portion 12, such for example as the screw threads 16, being determined by the character of the particular cooperative connection or fittings to which the coupling structure is to be attached. As best shown in Fig. 2, the flange portion 18 of the coupling body is polygonally shaped so as to facilitate the application of the coupling structure to the cooperative fitting or connection.

The coupling body extension 14 is arranged for threaded interengagement with the inner end portion 20 of a clamping or retainer sleeve 22. This sleeve acts as a clamping and retaining means for an interlocking sleeve 24 disposed within the retainer sleeve, and arranged to have positive interlocking engagement with the external surface of the hose structure 26.

As previously indicated, in the embodiment illustrated the hose structure is formed of a helically wound metal strip, the overlapping edges 28 and 30 of which are shaped for cooperative interlocking engagement. A helically wound cord of packing material, as indicated at 32, may or may not be provided, depending upon the particular requirements of the installation.

As will be understood, flexible metal hose of this type provides a groove, as indicated at 34, between the convolutions of the strip, extending helically of the hose structure. The interlocking sleeve 24 is adapted to have positive interlocking engagement with this helical groove, and to that end is provided with a cooperative helically disposed rib 36 extending into and interlocking with the groove. As best shown in Fig. 3, the sleeve 24 more specifically comprises a pair of semicylindrical members, as indicated at 38 and 40, cooperatively shaped so that when they are in cooperative arrangement they form a substantially continuous annular or cylindrical sleeve structure. The ribs 36 on the cooperative members 38 and 40 are so disposed and arranged that when the parts are in cooperative position a continuous helical rib is provided, of a pitch corresponding to that of the hose structure to which the sleeve is to be applied.

The sleeve members are provided with an outwardly turned flange portion 42 at their inner ends, which portion is clamped against a suitable annular packing, as indicated at 44, when the coupling structure is in assembled relation. This packing is adapted to be clamped between the sleeve flange 42 and a conical end face provided on the coupling body extension 14, the packing being thereby forced into tight gripping engagement with the external hose wall, as well as being forced into the hose groove 34, as indicated at 46, so as to provide a fluid-tight seal. The retainer sleeve is provided with an inwardly turned end flange 48 adapted to engage the outer end of the interlocking sleeve, so as to enable the proper compression of the packing structure, as well as to hold the interlocking sleeve in proper position.

In assembling the coupling structure upon the hose, the retainer sleeve 22 is first slipped onto the end of the hose and moved sufficiently away from the hose end, to the right as seen in Fig. 1, so as to be out of the way. The interlocking sleeve is then assembled into position by bringing the members 38 and 40 laterally into collective embracing relation with the external hose wall, at the approximately proper longitudinal position. The packing 44 is arranged in place, and the retainer sleeve then slid to the left into embracing relation with the interlocking sleeve elements. The coupling body 10 is then assembled in position, the extension 14 being screw threaded into the retainer sleeve portion 20, the latter being polygonally shaped externally, as shown in Fig. 2, to facilitate the proper wrench engagement. The screw threading interengagement may be continued until the packing is compressed to the proper extent.

Considerable difficulty has been encountered in providing satisfactory and readily operable coupling connections for hose of the type and kind set forth, due to the fact that in severing the ends of the helical strip by the usual means ragged edges and irregularities are produced which render the hose end 50 irregular and out of size. In accordance with the present construction it will be seen that the inturned flange portion 48 of the retainer sleeve 22 has loose fitting relationship to the hose so that such irregularities do not prevent the application of the retainer sleeve over the hose end. The interlocking sleeve 24, which is adapted to have close fitting engagement with the external hose wall, is applied in sectional form laterally to the hose so that irregularities at the hose end do not interfere with the application of the sleeve. Still further, irregularity or variation in the overall diameter of the hose due to inaccuracy or variability in the coiling of the helical hose strip are compensated for by the sectional characteristic of the interlocking sleeve, the semicylindrical shell portions of the sleeve being separable to accommodate an oversize hose condition. At the same time the interlocking sleeve provides positive interlocking engagement with the hose wall, resisting all end thrust of the hose due to high internal pressures. The parts may be readily assembled, and the packing 44 brought into compressed condition, whereby to provide a fluid-tight and mechanically strong coupling connection for the hose or tubing structure.

In accordance with the invention, the sleeve members 38 and 40 are produced by stamping operations. A die structure suitable for forming one of the semicylindrical sleeve members is illustrated in Fig. 4. As shown, the die structure comprises cooperative lower and upper die blocks 52 and 54, the work piece engaging portions of which are shaped so that the shell-like sleeve member, for example the member 40, may be produced from a flat sheet metal plate by a single stamping operation. More specifically, the die matrix or block 52 is provided with a trough-like portion 56 adapted to form the main curved body of the sleeve member, and with a portion 58 for forming the flange 42. The curved die portion 56 is provided with ribs 60 arranged to form the sleeve ribs 36 as an incident to and simultaneously with the stamping operation. For effecting the initial positioning of the work piece, prior to the stamping operation, the die block 52 may be provided with a positioning cavity or recess as indicated at 62. As will be understood, the working portions of the upper die block 54 are cooperatively shaped to those of the lower die block, to effect the stamping and shaping of the work piece.

The die blocks for the sleeve member 38 will be similar to those for the member 40 except for the positioning of the ribs 60, to effect the proper placement of the sleeve ridges 36.

The retainer sleeve 22 is also preferably formed by stamping operations, from initially flat sheet metal stock, as illustrated in Figs. 5 to 11 inclusive. The stamping operations may be generally similar to those set forth and described in the application of Axel Fredrick Johnson, Serial No. 544,572, filed July 12, 1944 is abandoned, and entitled "Coupling Structure and Method of Making."

As shown in Fig. 5, the work piece 22, of flat sheet metal stock is first arranged within the positioning recess 64 of a die block 66, a cooperative die block 68 also preferably being employed to lightly engage the upper face of the work piece and hold it in position. The die blocks 66 and 68 are provided with cooperative central bores to receive a reciprocable die plunger 70 which on downward movement shapes the flat sheet metal work piece into cup-like form, as indicated in Fig. 5 in dotted lines.

The work piece may be drawn into further elongated cylindrical shaping by means of a die block 72 and cooperative plunger 74, as shown in Fig. 6, the plunger on downward movement being adapted to draw the work piece into the die blocks, as indicated in dotted lines, to effect the further working axial elongation thereof.

The work piece, as thus formed, is shown in Fig. 9.

The bottom 76 may then be stamped from the work piece by means of a die block 78 and cooperative die plunger 80, as shown in Fig. 7. It will be seen that as the plunger 80 is depressed into the recess of the block 78, the bottom 76 of the work piece is blanked or stamped out, and the inturned annular flange 48 of the work piece simultaneously formed.

The work piece is next operated upon by means as shown in Fig. 8 comprising a die block 82 and cooperative plunger 84, the recess of the die block and the surface of the plunger being cooperatively shaped so as to impart the polygonal shaping to the end portions 20 of the work piece. The work piece, as thus formed, is shown in Fig. 10. Preferably the die block 82 is of the split type to facilitate work piece removal.

The end 20 of the work piece is next internally threaded, as indicated in Fig. 11, to complete the fabrication of the retainer sleeve structure. It will be seen that the retainer sleeve is essentially fabricated by stamping operations, the internal threading of the sleeve bore 20 being the only machining operation required.

A modified structural embodiment is illustrated in Figs. 12–15, which may for example preferably be used with hose and tubing structures of larger size.

The coupling connection illustrated comprises a pair of coupling structures generally indicated by the numerals 86 and 88. Both structures may be of the same construction, so that the detail of only one will be described. Each coupling comprises a main body sleeve 90 onto one end of which is secured a radially extending flange 92 by suitable means such as an annular weld, as indicated at 94. The flange 92 is provided with circumferentially spaced openings for the reception of a series of nut and bolt structures 96–98 by means of which the flange members 92 of the two couplings are secured together in clamping engagement with a gasket 100 to provide a fluid-tight joint.

A smaller annular flange member 102 is secured to a mid-portion of the sleeve 90 by welds 104, this flange being arranged to provide an anchorage for a series of nut and bolt structures 106 and 108 as shown. A clamping or retainer sleeve 110, functionally similar to the sleeve 22 in the embodiment previously described is provided in embracing relation to an interlocking sleeve 112, similar to the previously described sleeve 24. The sleeve 112 is in positive interlocked engagement with the hose, as indicated at 26a, by reason of the mechanical interengagement between the sleeve ribs 36a and the helical groove 34a of the tubing, as in the embodiment previously described. The sleeve 112 may be of stamped sheet metal, formed as previously described, and is similar structurally and functionally to the sleeve 24 except that, as illustrated in Figs. 13 and 14, it is additionally sectionalized, three cooperative sleeve sections being provided as indicated at 114, 116 and 118, respectively.

The retainer sleeve 110, provided with the inturned flange 48a at one end, as indicated, is in this instance provided at its other end with an outwardly extending flange 120 having openings for receiving the bolts 108 and by means of which the packing 44a is compressed between the flange portion 42a of the interlocking sleeve and the conical end face of the cylindrical body member 90, to effect the formation of a fluid-tight joint.

The manner of forming the retainer sleeve by stamping operations is illustrated in Fig. 15. As shown, the flat sheet metal work piece may be initially placed as indicated in dotted lines, within the positioning recess of a die block 122; a cooperable die block 124 being provided lightly engageable with the upper face of the work piece to aid in holding it in position. Upon depression of the plunger 126 the work piece will be formed into the shape indicated in solid lines. Thereafter the bottom of the work piece may be blanked out, leaving the flange 48a, by die mechanism similar to that illustrated in Fig. 7.

Sleeves 90 and 110 are loose fitting, in respect to the diameter of the hose, whereas the interlocking sleeve 112 is sectionalized for lateral application to the hose wall. The manner of assembling the structure upon the hose, and its manner of operation, is believed to be obvious from what has heretofore been said with respect to the previously described structure.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A coupling structure for convoluted flexible hose comprising a coupling body member including a cylindrical end portion, an interlocking sleeve including mating sections each provided with ribs interfitting with the hose convolutions, said interlocking sleeve having an outward flange portion axially opposed to the adjacent end portion of the coupling body member, an annular packing ring between the said flange portion of the interlocking sleeve and the adjacent end portion of the coupling body member and contacting the adjacent surface of the hose, a retainer sleeve overlying and confining said interlocking sleeve and including a radially inwardly extending projection for engagement with said interlocking sleeve, and means interconnecting said coupling body member with said retainer sleeve for axially tightening the same together whereby to compress the annular packing between the flange portion of said interlocking sleeve and the adjacent end portion of the coupling body member and against the adjacent periphery of the hose.

2. A coupling structure as claimed in claim 1, wherein the radially inwardly extending projection on the retainer sleeve consists of an inward shoulder portion backing and abutting the flange portion of the interlocking sleeve.

JOHN F. P. FARRAR.

REFERENCES CITED

The following references are of record in the file of this patent:

UNITED STATES PATENTS

| Number | Name | Date |
|---|---|---|
| 454,647 | Hallas | June 23, 1891 |
| 1,759,224 | Dick | May 20, 1930 |
| 2,090,250 | Cowles | Aug. 17, 1937 |
| 2,357,669 | Lake | Sept. 5, 1944 |
| 2,363,586 | Guarnaschelli | Nov. 28, 1944 |

FOREIGN PATENTS

| Number | Country | Date |
|---|---|---|
| 14,161 | Great Britain | June 17, 1912 |